United States Patent
Kutzmann

(10) Patent No.: US 9,284,061 B2
(45) Date of Patent: Mar. 15, 2016

(54) MULTIPURPOSE FLYING BOOM

(71) Applicant: THE BOEING COMPANY, Chicago, IL (US)

(72) Inventor: Aaron J. Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 231 days.

(21) Appl. No.: 13/960,614

(22) Filed: Aug. 6, 2013

(65) Prior Publication Data

US 2015/0041591 A1 Feb. 12, 2015

(51) Int. Cl.
*B64D 39/00* (2006.01)
*B64D 39/04* (2006.01)
*B64D 39/06* (2006.01)

(52) U.S. Cl.
CPC ................ *B64D 39/00* (2013.01); *B64D 39/04* (2013.01); *B64D 39/06* (2013.01); *B64D 2700/62412* (2013.01); *Y10T 29/49826* (2015.01)

(58) Field of Classification Search
CPC ........ B64C 39/00; B64C 39/02; B64C 39/04; B64C 39/06
See application file for complete search history.

(56) References Cited

U.S. PATENT DOCUMENTS

| | | | | |
|---|---|---|---|---|
| 5,141,178 A | * | 8/1992 | Alden et al. | 244/135 A |
| 7,147,186 B2 | | 12/2006 | Adelson | |
| 7,188,807 B2 | * | 3/2007 | Smith | 244/135 A |
| 7,422,179 B2 | * | 9/2008 | Mouskis | 244/135 A |
| 8,366,048 B2 | * | 2/2013 | Mouskis | 244/135 A |
| 2006/0000950 A1 | * | 1/2006 | Von Thal et al. | 244/135 A |
| 2013/0168497 A1 | * | 7/2013 | Rix | 244/135 A |
| 2014/0306063 A1 | * | 10/2014 | Kusnitz | 244/135 A |
| 2014/0346279 A1 | * | 11/2014 | Foo et al. | 244/135 A |

FOREIGN PATENT DOCUMENTS

| | | |
|---|---|---|
| DE | 10013751 A1 | 10/2001 |
| EP | 1700784 A1 | 9/2006 |
| EP | 2243705 A2 | 10/2010 |
| WO | 2007044021 A1 | 4/2007 |

* cited by examiner

*Primary Examiner* — Tien Dinh
*Assistant Examiner* — Richard R Green
(74) *Attorney, Agent, or Firm* — Duft Bornsen & Fettig LLP

(57) ABSTRACT

Embodiments provide a flying boom that is capable of refueling both receptacle-equipped aircraft and probe-equipped aircraft. In one embodiment, a flying boom includes a refueling tube at an end of the flying boom that is adapted to extend from the end of the flying boom to refuel receptacle-equipped aircraft. The flying boom further includes a retractable hose and drogue assembly at the end of the flying boom that is adapted to extend from the end of the flying boom to refuel probe-equipped aircraft.

19 Claims, 6 Drawing Sheets

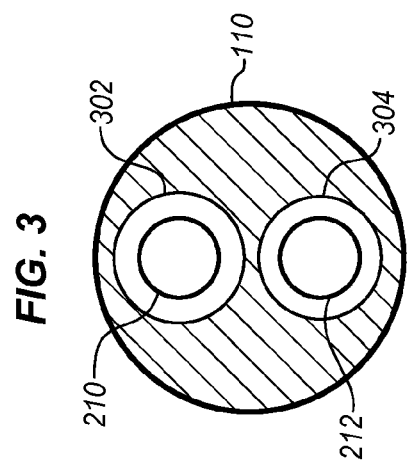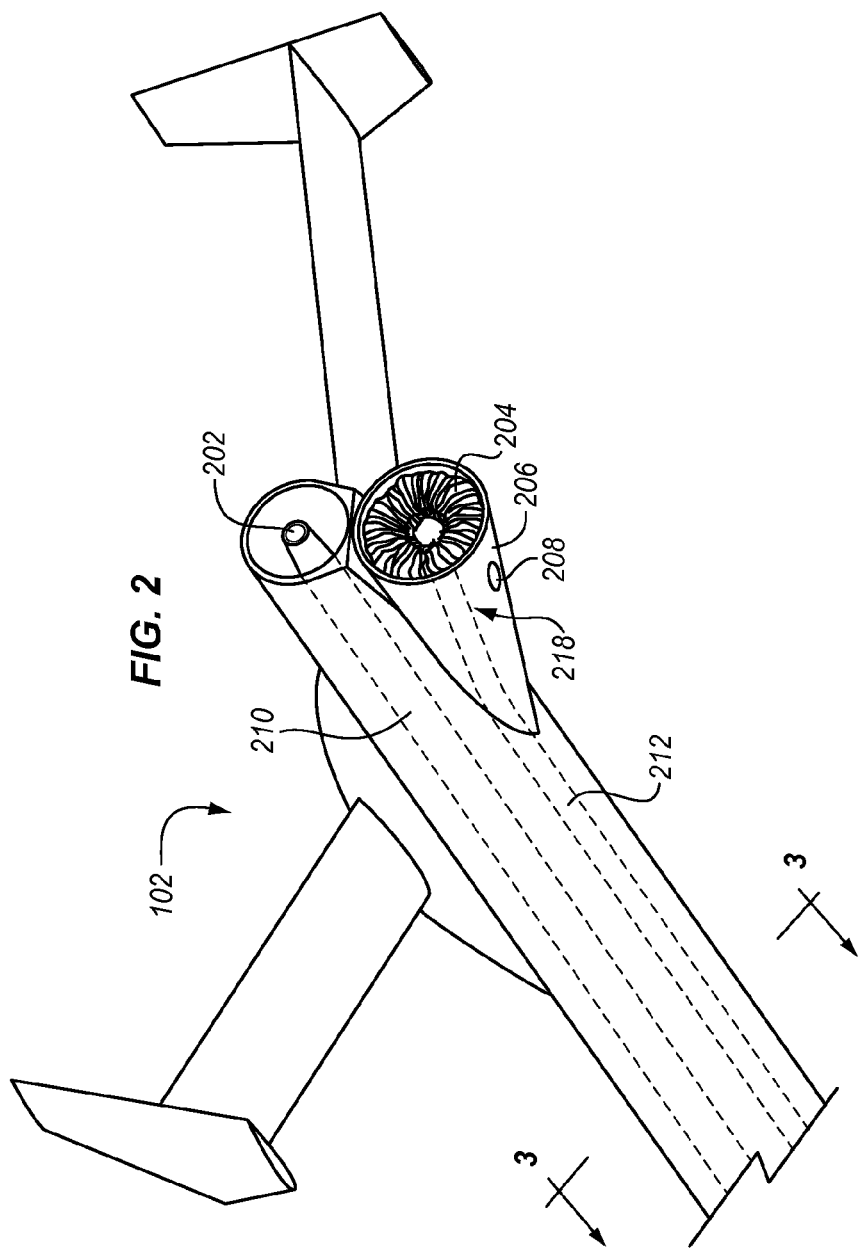

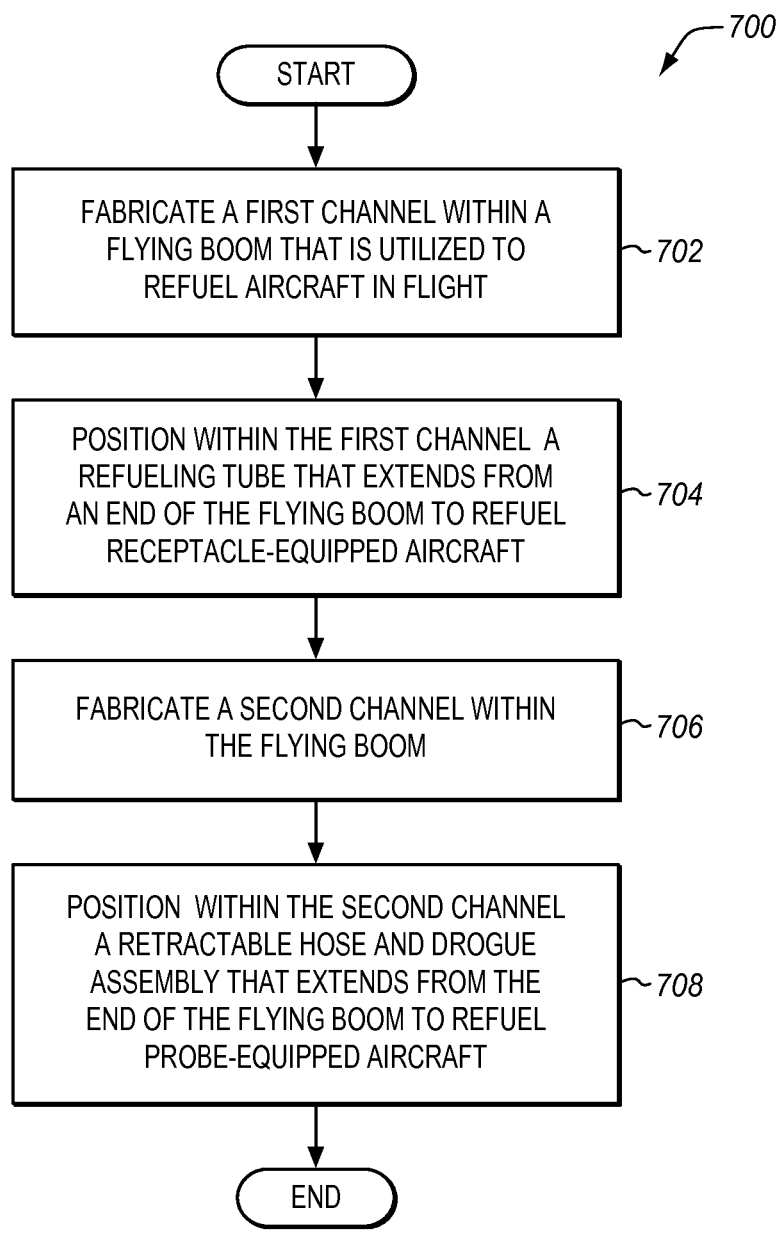

MULTIPURPOSE FLYING BOOM

FIELD

This disclosure relates to the field of aerial refueling systems.

BACKGROUND

Aerial refueling is the process of transferring fuel from one aircraft to another during flight. Aerial refueling is used to prolong the amount of time an aircraft can remain airborne, and may also allow an aircraft to take-off with a larger payload by reducing the weight of the fuel onboard the aircraft during take-off. After take-off, the aircraft can then be topped off with fuel.

One refueling system in use today for aerial refueling is a hose-and-drogue system. Another refueling system is a flying boom system. For the hose-and-drogue system, a tanker configured uses a drogue (similar to a windsock) at the end of a refueling hose. During refueling operations, the tanker unreels the refueling hose off of a hose reel to deploy the hose and the attached drogue. A receiver aircraft to be refueled guides a probe on the aircraft into the drogue. Once mated, the tanker delivers fuel to the receiver aircraft through the refueling hose. While the hose-and-drogue system is generally less complicated to implement than a flying boom system, it delivers fuel at a lower rate than the flying boom system. The United States (US) Air force recognized this during the 1950's and switched from the hose-and-drogue system to the flying boom system to allow for large bombers to be refueled faster. However, the US Navy continues to use the hose-and-drogue system for its aircraft. The hose-and-drogue system is also used by the North Atlantic Treaty Organization (NATO).

A tanker equipped with the flying boom system uses a boom coupled to the back of the tanker to deliver fuel. The boom is attached to the tanker using a joint at the tanker end that is free to move. The boom also has flight control surfaces that allow an operator on the tanker to effectively "fly" the boom into position for refueling a receiver aircraft. Once in position, the operator deploys a refueling tube from the end of the boom that mates with a receptacle on the receiver aircraft. Once mated, the tanker delivers fuel to the receiver aircraft through the refueling tube. One example of a type of receptacle for mating with a refueling tube is a Universal Aerial Refueling Receptacle Slipway Installation (UARRSI), which is found on US Air Force aircraft. While the flying boom system is generally more complicated to implement than the hose-and-drogue system, it can deliver fuel at a faster rate than the hose-and-drogue system.

One problem encountered in providing refueling services to aircraft in mixed forces (e.g., refueling both US Air force and US Navy aircraft during the same mission) is the incompatibility between the hose-and-drogue system and the flying boom system because aircraft equipped for one system cannot be refueled by the other system. Although drogue adapters exist for the flying boom system, the use of the drogue adapter during refueling activities precludes receptacle-equipped aircraft from being refueled by flying booms that have been fitted with the drogue adapter.

In view of the above discussion, problems remain for implementing refueling systems efficiently, especially when mixed force refueling activities are performed.

SUMMARY

Embodiments described herein provide an enhanced flying boom that can refuel both receptacle-equipped aircraft and probe-equipped aircraft. The enhanced flying boom includes a refueling tube that extends from an end of the enhanced flying boom to refuel receptacle-equipped aircraft (e.g., UARRSI equipped aircraft used by the US Air Force). The enhanced flying boom also includes a retractable hose and drogue assembly that deploys from the end of the enhanced flying boom to refuel probe-equipped aircraft (e.g., NATO and U.S. Navy aircraft).

One embodiment is an enhanced flying boom adapted to refuel aircraft in flight. The enhanced flying boom includes a refueling tube that is adapted to extend from an end of the flying boom to refuel receptacle-equipped aircraft. The enhanced flying boom further includes a hose and drogue assembly that is adapted to extend from the end of the enhanced flying boom to refuel probe-equipped aircraft.

Another embodiment is a method of manufacturing an enhanced flying boom to refuel aircraft in flight. The method comprises fabricating a first channel within a flying boom, and positioning within the first channel a refueling tube that extends from an end of the flying boom to refuel receptacle-equipped aircraft. The method further comprises fabricating a second channel within the flying boom and positioning within the second channel a retractable hose and drogue assembly that extends from the end of the flying boom to refuel probe-equipped aircraft.

Another embodiment is an apparatus that includes a boom, a movable flight control surface, a refueling tube, a retractable hose and drogue assembly, and a fuel pump. The boom has a first end that is adapted to couple with a refueling tanker. The boom has a second end opposite the first end along a length of the boom. The movable flight surface is coupled to the boom and is proximate to the second end. The refueling tube is within a first channel of the boom and is adapted to extend from the second end of the boom to refuel Universal Aerial Refueling Receptacle Slipway Installation (UARRSI) equipped aircraft. The retractable hose and drogue assembly is within a second channel of the boom and is adapted to extend from the second end of the boom to refuel probe-equipped aircraft. The fuel pump is coupled with the refueling tube and the retractable hose and drogue assembly.

The features, functions, and advantages that have been discussed can be achieved independently in various embodiments or may be combined in yet other embodiments further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings

FIG. 2 is an illustration of the enhanced flying boom of FIG. 1 in an exemplary embodiment.

FIG. 3 is an illustration of a cross-sectional view of the enhanced flying boom of FIGS. 1 and 2 in an exemplary embodiment.

FIG. 7 is a flow chart of a method of fabricating the enhanced flying boom of FIGS. 1 and 2 in an exemplary embodiment.

DESCRIPTION

The figures and the following description illustrate specific exemplary embodiments. It will thus be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
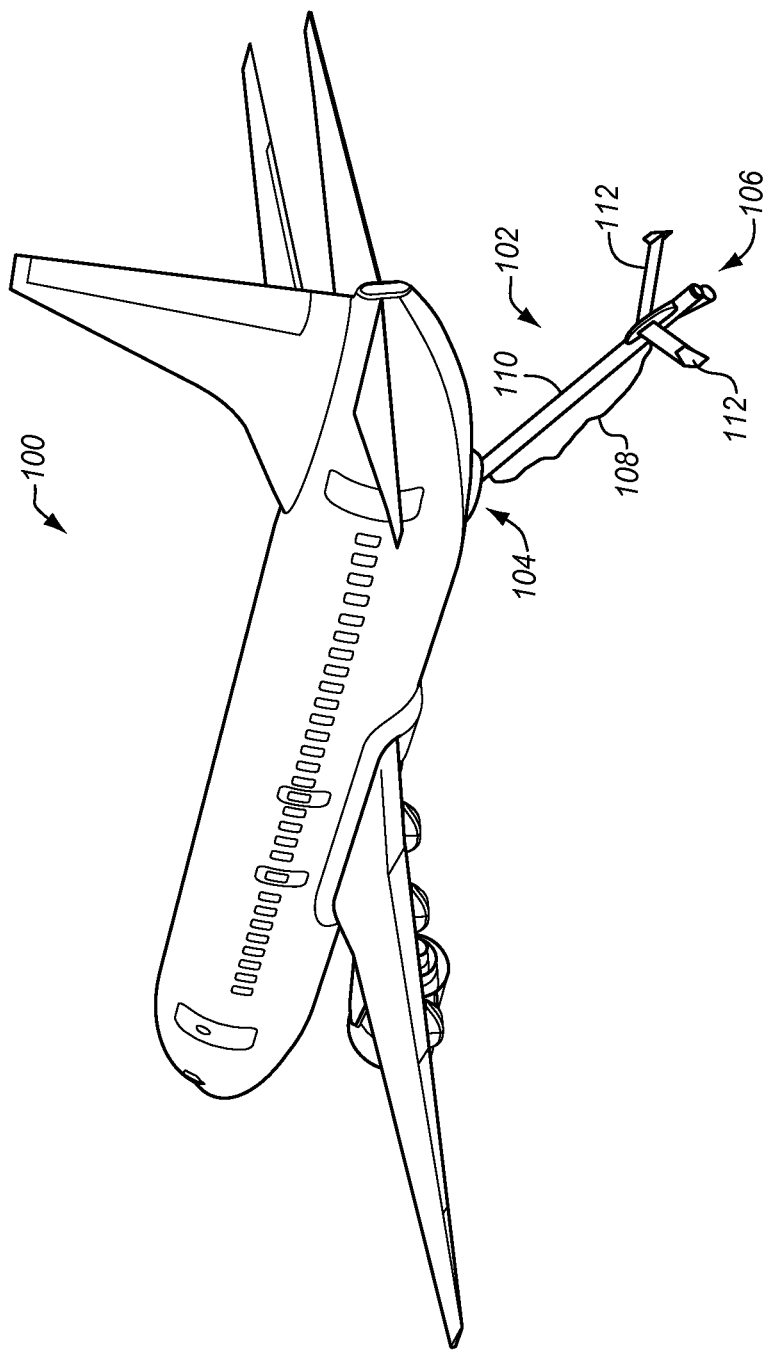
FIG. 1 is an illustration of a refueling tanker that includes an enhanced flying boom in an exemplary embodiment.

FIG. 1 is an illustration of a refueling tanker 100 that includes an enhanced flying boom 102 in an exemplary embodiment. Tanker 100 provides refueling services to a variety of aircraft utilizing enhanced flying boom 102. In this embodiment, tanker 100 can refuel both receptacle-equipped aircraft and probe-equipped aircraft.

The receptacle on a receptacle-equipped aircraft comprises any system, component, or device that can mate to a rigid refueling tube to receive fuel. The receptacle is located proximate to the front of the aircraft at the top of the airframe. One example of a receptacle is a UARRSI receptacle on US Air Force aircraft.

The probe on a probe-equipped aircraft comprises any component, system, or device that can mate to a drogue of a hose-and-drogue system. The probe may be fixed in place to the aircraft, deployable from the aircraft, or removable. The probe is located proximate to the front of the aircraft and extends forward along the fuselage. This allows the pilot to fly the probe into the drogue for refueling.

One problem in providing refueling services to aircraft from different forces is that a single standard does not exist for aerial refueling. In some cases, aircraft include a receptacle that mates with a refueling tube, while other aircraft include a probe that mates with a hose and drogue assembly. Each refueling system has its own strengths and weaknesses, which is why different forces select one system over another.

In the embodiment of FIG. 1, tanker 100 is able to refuel both receptacle-equipped aircraft and probe-equipped aircraft utilizing enhanced flying boom 102. Enhanced flying boom 102 includes features that allow tanker 100 to perform this activity that will be discussed in more detail later.

Enhanced flying boom 102 has a first end 104 that is coupled to tanker 100. First end 104 couples to tanker 100 using a movable joint or hinge that allows enhanced flying boom 102 to pivot around the joint to allow a second end 106 of enhanced flying boom 102 to be positioned correctly during a refueling process. Second end 106 is disposed away from first end 104 along a length 108 of an elongated member 110. Enhanced flying boom 102 further includes movable flight control surfaces 112 coupled to member 110 that act as airfoils in flight and are used to adjust a position of second end 106.

FIGS. 2-3 are illustrations of enhanced flying boom 102 in an exemplary embodiment. Enhanced flying boom 102 includes a first channel 302 (see FIG. 3) that houses a refueling tube 210 (see FIGS. 2-3). Refueling tube 210 can be extended from first channel 302 within enhanced flying boom 102 to allow an end 202 of refueling tube 210 to mate with a receptacle on a receptacle-equipped aircraft.

Enhanced flying boom 102 also includes a second channel 304 (see FIG. 3) that houses a hose and drogue assembly 218 (see FIG. 2). Hose and drogue assembly 218 includes a hose 212 and a drogue 204. Hose and drogue assembly 218 can be extended from second channel 304 within enhanced flying boom 102 to allow drogue 204 to mate with a probe on a probe-equipped aircraft. When hose 212 is retracted within second channel 304 of enhanced flying boom 102, drogue 204 is captured by a drogue housing 206 located at second end 106 of enhanced flying boom 102. In some embodiments, drogue housing 206 includes an air vent 208 or some other type of feature that allows air to pressurize drogue housing 206 to allow hose and drogue assembly 218 to be deployed. In some embodiments, second channel 304 may include hose guides (e.g., rollers) that guide hose 212 within second channel 304.

In this embodiment, enhanced flying boom 102 is able to refuel both receptacle-equipped aircraft (e.g., UARRSI equipped US Air Force aircraft) and probe-equipped aircraft (e.g., US Navy or NATO aircraft) by including both refueling tube 210 and hose and drogue assembly 218 within enhanced flying boom 102. Generally, enhanced flying boom 102 can refuel both receptacle-equipped aircraft and probe-equipped aircraft on the same flight. For instance, enhanced flying boom 102 may first refuel US Navy aircraft using hose and drogue assembly 218 and subsequently refuel US Air Force aircraft using refueling tube 210. This is performed without having to land and re-configure enhanced flying boom 102 to support this activity. In prior flying boom systems, a hose adapter could be fitted to a flying boom to refuel probe-equipped aircraft. However, the hose adapter precluded receptacle-equipped aircraft from being refueled as long as the adapter was fitted to the flying boom. In prior flying boom systems, a tanker would first land and have the hose adapter removed prior to being able to refuel receptacle-equipped aircraft. In contrast, enhanced flying boom 102 can refuel both receptacle-equipped aircraft and probe-equipped aircraft during the same flight. That is, tanker 100 does not have to land for reconfiguration prior to switching from refueling receptacle-equipped aircraft to probe-equipped aircraft. Although a specific configuration for enhanced flying boom 102 is illustrated in FIG. 2, other configurations may exist as a matter of design choice.

During a refueling mission, an operator on tanker 100 positions enhanced flying boom 102 using movable flight control surfaces 112 relative to a receiver aircraft for refueling. The operator on tanker 100 may first identify the type of receiver aircraft in order to determine the type of refueling operation to perform using enhanced flying boom 102. For instance, because enhanced flying boom 102 may refuel both receptacle-equipped aircraft and probe-equipped aircraft, the operator may perform refueling operations on both types of aircraft during the same flight.

Figure 4:
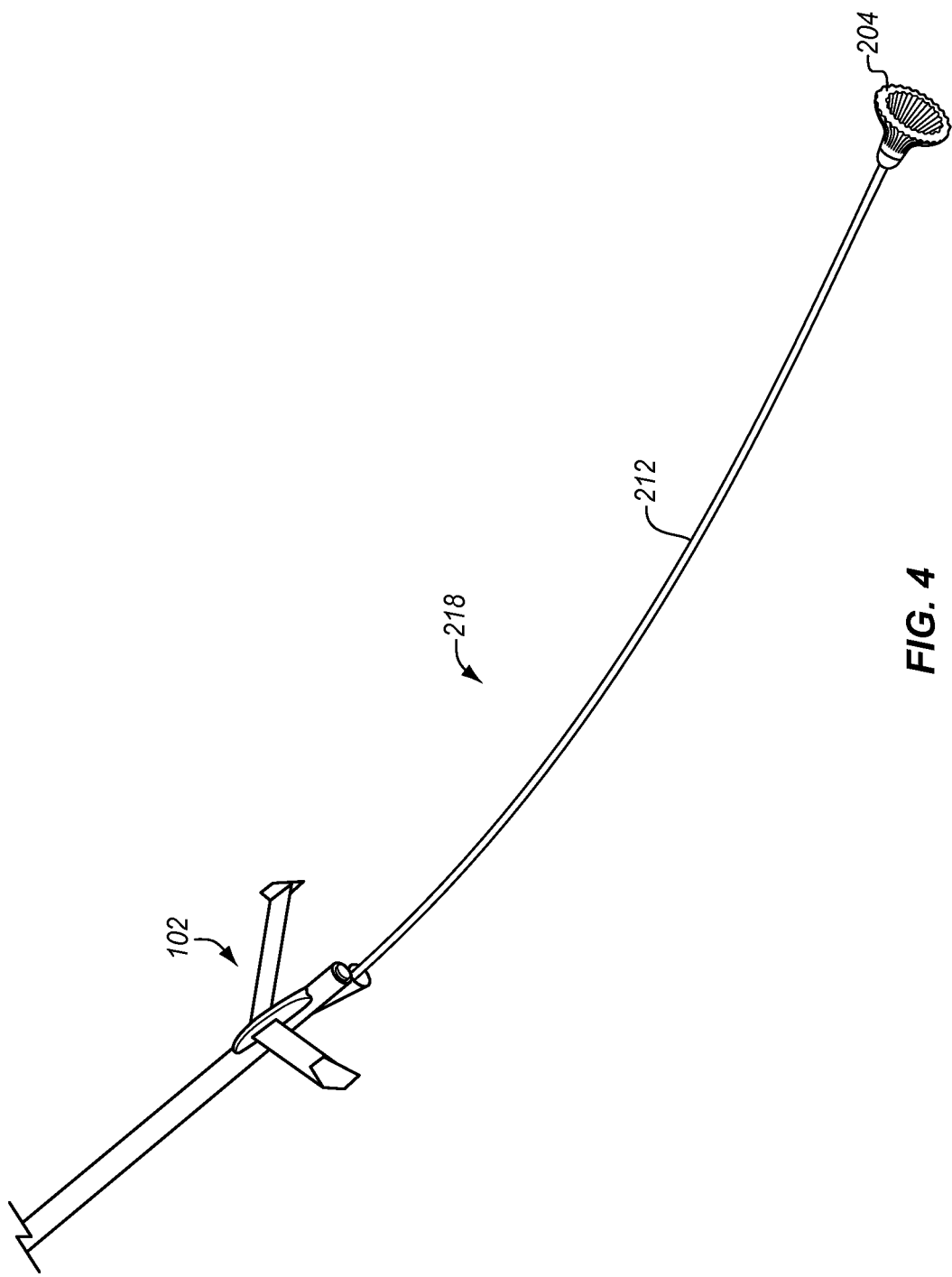
FIG. 4 is an illustration of the enhanced flying boom of FIGS. 1 and 2 with a hose and drogue assembly deployed in an exemplary embodiment.

If the receiver aircraft is a probe-equipped aircraft, such as a US Navy Jet, the operator on tanker 100 extends hose and drogue assembly 218 from second end 106 of enhanced flying boom 102. This is shown in FIG. 4, which is an illustration of enhanced flying boom 102 with hose and drogue assembly 218 deployed in an exemplary embodiment. To deploy hose and drogue assembly 218, the operator may remove the tension on hose 212 (e.g., if hose 212 is attached to a reel, the operator may rotate the reel to un-reel hose 212 off of the reel). Air passing by drogue housing 206 then draws drogue 204 out of drogue housing 206. In some embodiments, drogue housing 206 may be a cone shaped indention that retains and collapses drogue 204 when hose 212 is retracted into enhanced flying boom 102. After deploying hose and drogue assembly 218, the receiver aircraft may then mate its probe with drogue 204. This opens a valve at the end of hose 212. Tanker 100 may then begin transferring fuel to the receiver aircraft along hose 212. When refueling of the receiver aircraft is completed, the operator on the tanker retracts hose and drogue assembly 218 back into second channel 304 of enhanced flying boom 102. To do so, the operator may apply tension to hose 212 (e.g., if hose 212 is attached to a reel, the operator may rotate the reel to reel in hose 212). This draws hose 212 back inside second channel 304 and drogue 206 back inside drogue housing 206.

Figure 5:
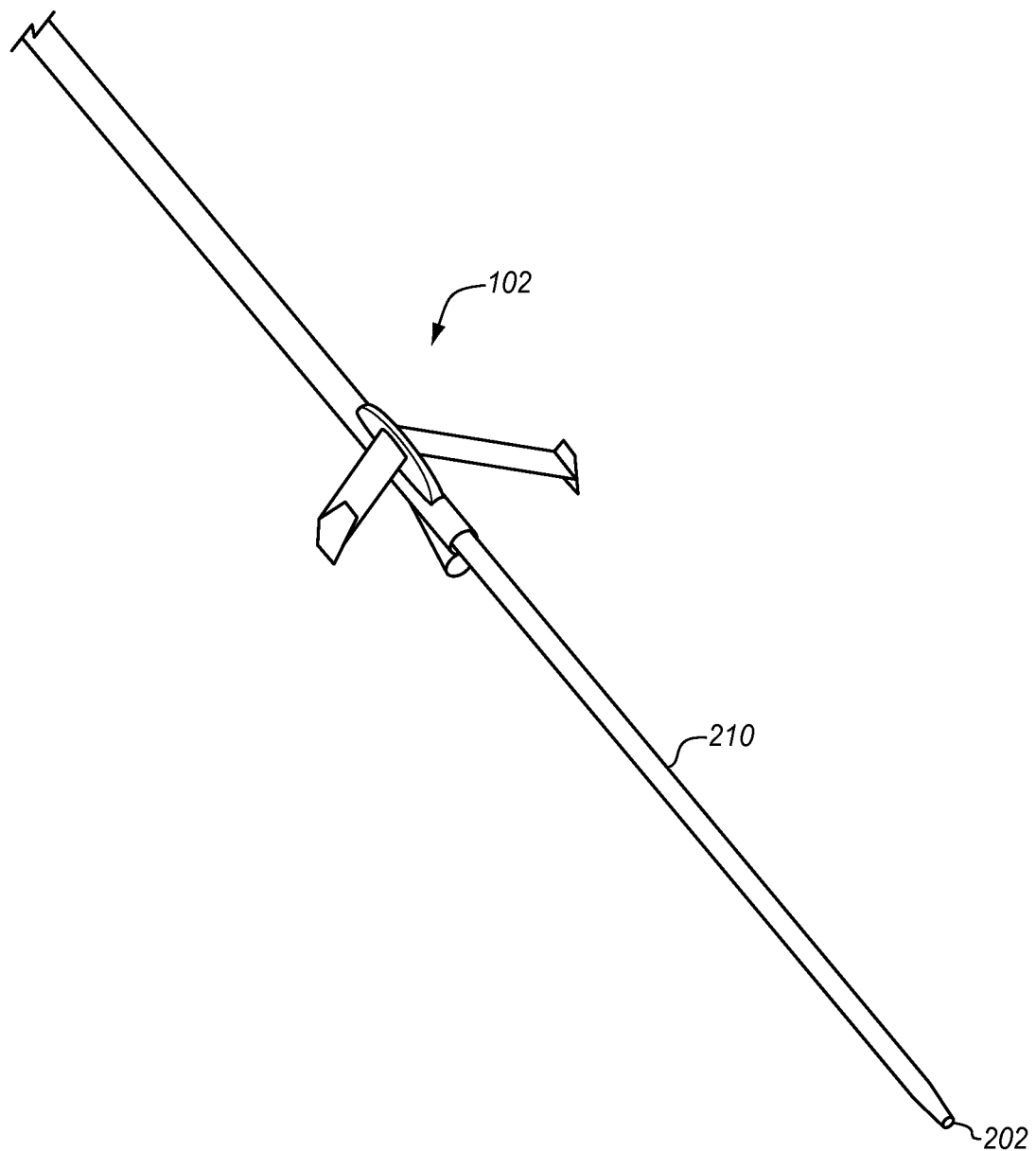
FIG. 5 is an illustration of the enhanced flying boom of FIGS. 1 and 2 with a refueling tube deployed.

If the receiver aircraft is a receptacle-equipped aircraft, such as a US Air force Jet, the operator extends refueling tube 210 from first channel 302 of enhanced flying boom 102 when the receiver aircraft is in position for refueling. This is shown in FIG. 5, which is an illustration of enhanced flying boom 102 with refueling tube 210 deployed. Refueling tube 210 extends until end 202 of refueling tube mates with the receptacle of the receiver aircraft. This opens a valve at end 202 of refueling tube. Tanker 100 may then begin transferring fuel to the receiver aircraft along refueling tube 210. When refueling of the receiver aircraft is completed, the operator on the tanker retracts refueling tube 210 into first channel 302 of enhanced flying boom 102.

One advantage of enhanced flying boom 102 is that aircraft utilizing different refueling systems can be serviced by enhanced flying boom 102 on the same flight. That is, tanker 100 can utilize enhanced flying boom 102 instead of separate refueling systems (e.g., a typical flying boom and a separate hose and drogue system). This can reduce the weight and drag on tanker 100 by eliminating the hose and drogue system from the tanker, which allows tanker 100 to remain on a refueling mission longer.

Figure 6:
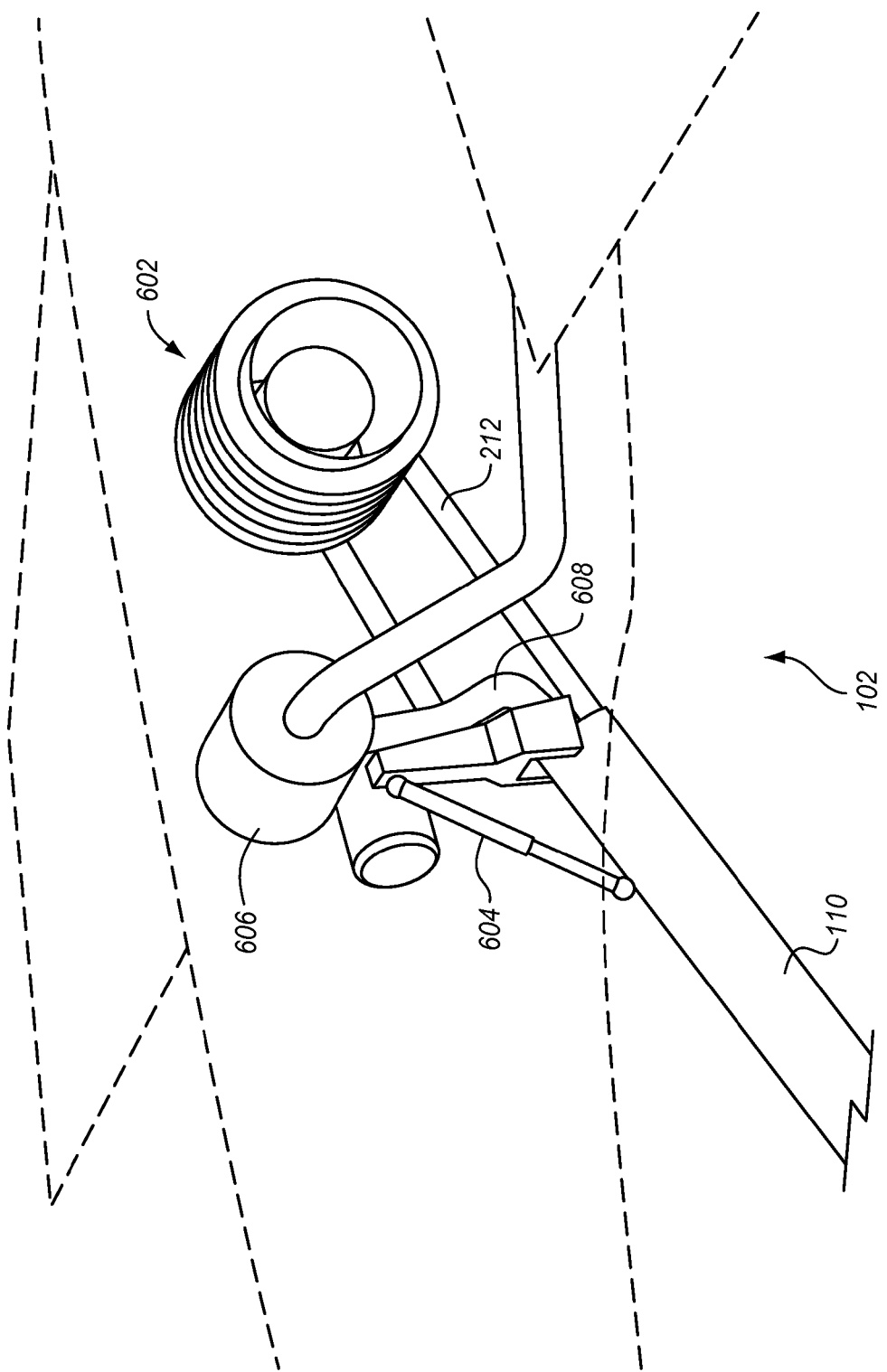
FIG. 6 is an illustration of the enhanced flying boom of FIGS. 1 and 2 in another exemplary embodiment.

FIG. 6 is an illustration of enhanced flying boom 102 in another exemplary embodiment. In this embodiment, a hose reel 602 is utilized to "reel in" or "reel out" hose 212 along second channel 304 (not shown in FIG. 6) within member 110 of enhanced flying boom 102. During a refueling operation for probe-equipped aircraft, an operator deploys enhanced flying boom 102 utilizing a boom actuator 604 from tanker 100. Boom actuator 604 allows second end 106 of enhanced flying boom 102 to be positioned proximate to a tail of tanker 100 during takeoff and landings. During a refueling operation, the operator deploys enhanced flying boom 102 and positions second end 106 of enhanced flying boom 102 using flight control surfaces 112 (see FIG. 1) relative to a receiver aircraft, and rotates hose reel 602 to "reel out" hose 212 (and attached drogue 204, not shown) from second end 106 of enhanced flying boom 102 (see FIG. 2). Hose 212 is coupled with a fuel pump 606 that delivers fuel to hose 212 during a refueling process. Although only one fuel pump 606 is shown in FIG. 6, multiple fuel pumps may be utilized as a matter of design choice. Fuel pump 606 is also coupled with a refueling tube assembly 608 in this embodiment. Refueling tube assembly 608 is coupled with refueling tube 210 (see FIG. 4) that is used for refueling receptacle-equipped aircraft. In this embodiment, fuel pump 606 is a common fuel pump that provides fuel delivery for both receptacle-equipped aircraft refueling operations and probe-equipped aircraft refueling operations. This also reduces the complexity of the system illustrated in FIG. 6 by utilizing one common fuel pump 606 for refueling both receptacle-equipped aircraft and probe-equipped aircraft. Boom refueling operations typically entail higher flow rates than hose and drogue. In an alternate embodiment, fuel pump 606 supplies fuel to refueling tube 210; while an alternate fuel pump (not shown in FIG. 6) supplies fuel to hose 212. After the refueling process is complete, the operator rotates hose reel 602 to "reel in" hose 212 (and attached drogue 204, not shown) back inside enhanced flying boom 102.

One of the benefits of hose and drogue refueling is that more than one aircraft can be refueled at the same time. Tankers are often capable of refueling two small receiver aircraft simultaneously from wing positions. Deploying a hose and drogue from the end of the boom allows the hose to be steered by the boom, thereby allowing a third small receiver aircraft to be refueled simultaneously behind and below the other two receiver aircraft.

One problem in prior hose-and-drogue refueling systems is related to hose whip. Hose whip occurs when the receiver aircraft inserts its probe into the drogue with enough forward speed that the tension on the hose is reduced enough that the hose bends or otherwise goes slack. In some cases the hose can whip about with enough force to damage the probe on the receiver aircraft. This effect may be reduced utilizing control surfaces 112 on enhanced flying boom 102. In cases of hose whip when refueling probe-equipped aircraft, the position of enhanced flying boom 102 can be rapidly adjusted using flight control surfaces 112 to effectively remove the slack from the hose. This may be done automatically in response to detecting that tension on hose 212 decreases. This reduces the possibility of damage to the probe on the receiver aircraft.

FIG. 7 is a flow chart of a method 700 of fabricating enhanced flying boom 102 in an exemplary embodiment. The steps of method 700 are not all inclusive and may include other steps not shown. Further, the steps may be performed in a different order. Step 702 comprises fabricating first channel 302 (see FIG. 2) within enhanced flying boom 102 that is utilized to refuel aircraft in flight. Step 704 comprises positioning within first channel 302 refueling tube 210 (see FIG. 2) that extends from second end 106 of enhanced flying boom 102 to refuel receptacle-equipped aircraft. Step 706 comprises fabricating second channel 304 within enhanced flying boom 102. Step 708 comprises positioning within second channel 304 hose and drogue assembly 218 that extends from second end 106 of enhanced flying boom 102 to refuel probe-equipped aircraft. Although method 700 has been described with respect to enhanced flying boom 102, one skilled in the art will recognize that method 700 may apply to other flying boom systems not shown.

Although specific embodiments were described herein, the scope is not limited to those specific embodiments. Rather, the scope is defined by the following claims and any equivalents thereof.

The invention claimed is:

1. An apparatus comprising:
   a flying boom having a first end adapted to couple to a refueling tanker and a second end opposite the first end along a length of the flying boom, the flying boom including:
   a first channel disposed within the flying boom from the first end to the second end;
   a refueling tube within the first channel that is adapted to extend from the second end to refuel receptacle-equipped aircraft;
   a second channel disposed within the flying boom from the first end to the second end; and
   a retractable hose and drogue assembly within the second channel that is adapted to extend from the first end to the second end to refuel probe-equipped aircraft.

2. The apparatus of claim 1 further comprising:
   a hose reel coupled with the hose and drogue assembly that is adapted to rotate and extend the hose and drogue assembly from the first end to the second end to refuel the probe-equipped aircraft.

3. The apparatus of claim 2 wherein:
the hose reel is further adapted to rotate and retract the hose and drogue assembly from the second end to the first end.

4. The apparatus of claim 1 further comprising:
a fuel pump coupled with the refueling tube and the hose and drogue assembly.

5. The apparatus of claim 1 wherein:
the refueling tube is operable to couple with a Universal Aerial Refueling Receptacle Slipway Installation (UARRSI) receptacle.

6. The apparatus of claim 1 wherein:
the flying boom includes a plurality of hose guides within the second channel that are operable to guide the hose along the second channel.

7. The apparatus of claim 1 wherein:
the second end includes a cone-shaped indention to retain the drogue when the hose is retracted.

8. The apparatus of claim 7 wherein:
the cone-shaped indention includes an air passage that is operable to apply tension to the hose for deployment of the hose and drogue assembly.

9. A method of manufacturing a flying boom having a first end adapted to couple to a refueling tanker and a second end opposite the first end along a length of the flying boom, the method comprising:
fabricating a first channel within the flying boom, the first channel disposed from the first end to the second end;
positioning within the first channel a refueling tube that extends from the second end to refuel receptacle-equipped aircraft;
fabricating a second channel within the flying boom, the second channel disposed from the first end to the second end; and
positioning within the second channel a retractable hose and drogue assembly that extends from the first end to the second end to refuel probe-equipped aircraft.

10. The method of claim 9 further comprising:
positioning a hose reel coupled with the hose and drogue assembly to rotate and extend the hose and drogue assembly from the first to the second end to refuel the probe-equipped aircraft.

11. The method of claim 10 further comprising:
configuring the hose reel to rotate and retract the hose and drogue assembly from the second end to the first end.

12. The method of claim 9 further comprising:
positioning a fuel pump coupled with the refueling tube and the hose and drogue assembly.

13. The method of claim 9 wherein:
the refueling tube couples with a Universal Aerial Refueling Receptacle Slipway Installation (UARRSI) receptacle.

14. The method of claim 9 wherein fabricating the second channel further comprises:
fabricating a plurality of hose guides within the second channel that guide the hose along the second channel.

15. The method of claim 9 wherein the method further comprises:
fabricating a cone-shaped indention into the second end to retain the drogue when the hose is retracted.

16. The method of claim 15 wherein fabricating the cone-shaped indention further comprises:
fabricating an air passage into the cone-shaped indention to apply tension to the hose for deployment of the hose and drogue assembly.

17. An apparatus comprising:
a boom having a first end adapted to couple to a refueling tanker and a second end opposite the first end along a length of the boom;
a movable flight control surface coupled to the boom and proximate to the second end;
a refueling tube within a first channel of the boom, the first channel disposed from the first end to the second end, the refueling tube adapted to extend from the second end to refuel Universal Aerial Refueling Receptacle Slipway Installation (UARRSI) equipped aircraft;
a retractable hose and drogue assembly within a second channel of the boom, the second channel disposed from the first end to the second end, the hose and drogue assembly adapted to extend from the second end to refuel probe-equipped aircraft; and
a fuel pump coupled with the refueling tube and the retractable hose and drogue assembly.

18. The apparatus of claim 17 further comprising:
a hose reel proximate to the first end that is coupled with the hose of the hose and drogue assembly.

19. The apparatus of claim 17 further comprising:
a plurality of hose guides within the second channel.

\* \* \* \* \*